United States Patent
Yoshida et al.

(10) Patent No.: US 10,711,079 B2
(45) Date of Patent: Jul. 14, 2020

(54) METHOD FOR PRODUCING VINYL ETHER POLYMER HAVING HYDROXYL GROUP ON SIDE CHAIN AND TEMPERATURE-RESPONSIVE POLYMER MIXTURE

(71) Applicant: MARUZEN PETROCHEMICAL CO., LTD., Tokyo (JP)

(72) Inventors: Norihiro Yoshida, Ichihara (JP); Shinji Sugihara, Fukui (JP)

(73) Assignee: Maruzen Petrochemical Co., Ltd., Chuo-Ku (JP)

( * ) Notice: Subject to any disclaimer, the term of this patent is extended or adjusted under 35 U.S.C. 154(b) by 127 days.

(21) Appl. No.: 15/780,843

(22) PCT Filed: Dec. 14, 2016

(86) PCT No.: PCT/JP2016/087300
§ 371 (c)(1),
(2) Date: Jun. 1, 2018

(87) PCT Pub. No.: WO2017/110634
PCT Pub. Date: Jun. 29, 2017

(65) Prior Publication Data
US 2018/0371127 A1    Dec. 27, 2018

(30) Foreign Application Priority Data

Dec. 21, 2015  (JP) ................................. 2015-248662

(51) Int. Cl.
| | | |
|---|---|---|
| *C08F 216/12* | (2006.01) | |
| *C08F 16/12* | (2006.01) | |
| *C08F 116/12* | (2006.01) | |
| *C08F 4/04* | (2006.01) | |
| *C08L 29/10* | (2006.01) | |
| *C08F 16/26* | (2006.01) | |
| *C08F 2/16* | (2006.01) | |
| *C08F 2/06* | (2006.01) | |

(52) U.S. Cl.
CPC .............. *C08F 116/12* (2013.01); *C08F 2/06* (2013.01); *C08F 2/16* (2013.01); *C08F 4/04* (2013.01); *C08F 16/26* (2013.01); *C08L 29/10* (2013.01); *C08F 2500/02* (2013.01); *C08F 2500/17* (2013.01)

(58) Field of Classification Search
CPC ........ C08F 116/12; C08F 16/12; C08F 16/14; C08F 16/26; C08F 116/14; C08F 216/12; C08F 216/14; C08F 216/1416; C08L 27/18
See application file for complete search history.

(56) References Cited

U.S. PATENT DOCUMENTS

| | | | |
|---|---|---|---|
| 5,071,895 A | 12/1991 | Hughes et al. | |
| 9,447,212 B2 * | 9/2016 | Okamatsu | ................ C08F 2/04 |
| 9,777,085 B2 * | 10/2017 | Sugihara | ................ C08F 16/26 |
| 2015/0005467 A1 | 1/2015 | Sugihara et al. | |
| 2016/0046743 A1 | 2/2016 | Okamatsu | |
| 2018/0179305 A1 * | 6/2018 | Sugihara | ................ C08F 16/26 |

FOREIGN PATENT DOCUMENTS

| | | | |
|---|---|---|---|
| EP | 3 318 583 A1 | 5/2018 | |
| JP | H03-088882 A1 | 4/1991 | |
| JP | H05-086124 A1 | 4/1993 | |
| JP | H06-313004 A1 | 11/1994 | |
| JP | H07-003201 A1 | 1/1995 | |
| JP | H08-157537 A1 | 6/1996 | |
| JP | 2013-166829 A1 | 8/2013 | |
| TW | 201402616 A | 1/2014 | |
| WO | 2013/122106 A1 | 8/2013 | |
| WO | WO-2013121910 A1 * | 8/2013 | ............ C08F 116/14 |
| WO | 2014/079722 A1 | 5/2014 | |
| WO | 2014/136948 A1 | 9/2014 | |
| WO | WO 2104136948 A1 * | 9/2014 | .............. C08F 16/12 |
| WO | 2017/006817 A1 | 1/2017 | |

OTHER PUBLICATIONS

Shinji Sugihara et al., "Thermosensitive Polyalcohols: Synthesis via Living Cationic Polymerization of Vinyl Ethers with a Silyloxy Group," *Journal of Polymer Science Part A: Polymer Chemistry*, vol. 41 (2003, pp. 3300-3312.
International Search Report and Written Opinion (Application No. PCT/JP2016/087300) dated Mar. 7, 2017.
Korean Office Action (Application No. 10-2018-7015812) dated Jul. 5, 2019.
English translation of International Preliminary Report on Patentability (Chapter I) (Application No. PCT/JP2016/087300) dated Jul. 5, 2018, 8 pages.
Taiwanese Office Action (Application No. 105142518) dated Oct. 16, 2019 (with English translation).
Japanese Office Action (with English translation) dated Aug. 2, 2019 from a corresponding Japanese patent application (JP 2015-248662), 8 pages.

(Continued)

*Primary Examiner* — Rip A Lee
(74) *Attorney, Agent, or Firm* — Burr & Brown, PLLC (57) ABSTRACT

[Object] To provide a method for producing a vinyl ether polymer having a hydroxyl group on the side chain, wherein the vinyl ether polymer having a low viscosity and excellent workability and processability is produced in a simple and efficient method.
[Means for solving problem] The present invention relates to a method for producing a vinyl ether polymer having a hydroxyl group on the side chain, characterized in that vinyl ether comprising a hydroxyl group is subjected to radical polymerization by using an oil-soluble azo polymerization initiator, in the presence of a mixed solvent comprising water and an organic solvent selected from alcohol or cyclic ether radical polymerization.

17 Claims, 1 Drawing Sheet

(56) References Cited

OTHER PUBLICATIONS

Extended European Search Report dated Jul. 9, 2019 from a corresponding European patent application (EP 16878525.1), 7 pages.
Korean Office Action (with English translation) from a corresponding Korean patent application (KR 10-2018-7015812) dated Nov. 19, 2019, 11 pages.
Korean Office Action (with English translation) from a corresponding Korean patent application (KR 10-2018-7015812) dated Jan. 23, 2020, 7 pages.

* cited by examiner

METHOD FOR PRODUCING VINYL ETHER POLYMER HAVING HYDROXYL GROUP ON SIDE CHAIN AND TEMPERATURE-RESPONSIVE POLYMER MIXTURE

TECHNICAL FIELD

The present invention relates to a method for producing a vinyl ether polymer having a hydroxyl group on the side chain and a temperature-responsive polymer mixture.

BACKGROUND ART

A vinyl ether polymer having a hydroxyl group on the side chain is useful as a water-soluble polymer or a temperature-responsive polymer.

For example, homopolymers of 2-hydroxyethyl vinyl ether (HEVE) and diethylene glycol monovinyl ether (DEGV) are known to be water-soluble and homopolymers of 4-hydroxybutyl vinyl ether (HBVE), HBVE/HEVE copolymers, and HBEV/DEGV copolymers are known to be temperature-responsive polymers that have variable hydrophilicity/hydrophobicity depending on the temperature.

Since generally vinyl ether is cation-polymerizable, radical polymerization is difficult to carry out with vinyl ether alone but still possible to carry out with the sole use of vinyl ether having a hydroxyl group; for example, radical polymerization can be performed by using an oil-soluble polymerization initiator in the presence of an inorganic solvent or a water-soluble organic solvent such as methanol (Patent Document 1). However, the conversion rate of the monomers was low and vinyl ether was not efficiently radical-polymerized in said method.

It was reported that when a water-soluble polymerization initiator was used, more polyacetals were generated than the target vinyl ether polymers (same Patent Document 1).

Meanwhile, the vinyl ether polymer having a hydroxyl group on the side chain is generally a highly viscous liquid polymer and has a problem of poor workability and processability. In addition, although these vinyl ether polymers are often used as a solution or an aqueous composition, the application is limited since it is difficult to use in high concentration due to its high viscosity.

The method to reduce the viscosity of the polymer includes, for example, a method of using a polymer having a smaller molecular weight. A method of using a chain transfer agent (a molecular weight modifier) is known as the method for reducing the molecular weight of the polymer in the radical polymerization.

For example, Patent Document 2 discloses a method for producing a low molecular weight polyacrylic acid by using secondary alcohols such as propylene glycol, 2-hexanol, and the like as the chain transfer agent. Patent Document 3 discloses a method for producing a low molecular weight soluble acrylic resin by radical polymerization in a solvent having a specific chain transfer constant such as isopropanol or in a mixed solvent of those and water.

However, in the case of conducting radical polymerization of vinyl ether having a hydroxyl group only, there has been no case in which a chain transfer agent was used or where the chain transfer constant was considered. Since the chain transfer agent greatly changes its performance depending on the type of monomers, it is not possible to obtain a suitable chain transfer agent or attain the knowledge of controlling molecular weights in the radical polymerization of vinyl ether having a hydroxyl group from the radical polymerization of an acrylic monomer as described in said Patent Document 2.

The temperature-responsive polymer generally stops showing a sharp temperature-responsiveness when the molecular weight of the polymer, the homogeneity of the composition ratio and the like are low. In the case where a chain transfer agent is used, a polymer having a terminal structure derived from the chain transfer agent and a polymer having a terminal structure derived from the initiator will be present in a mixed state, thereby making it difficult to predict the effect of the mixed presence of the terminal structure derived from the chain transfer agent on the temperature-responsiveness of the polymer.

Further, in the case of the vinyl ether polymer having a hydroxyl group on the side chain, it is considered not possible to obtain a sufficient effect of reduction in viscosity just by reducing the molecular weight since the effect is large of, not only the intertangled molecular chains, but also the hydrogen bonds by the side chain hydroxyl groups.

As for reducing the hydrogen bonds by the side chain hydroxyl groups in the case of the vinyl ether polymer having a hydroxyl group on the side chain, there can be considered a method of introducing vinyl ether which has no hydroxyl group such as alkyl vinyl ether as a hydrophobic unit.

However, since vinyl ether which has no hydroxyl group is low in reactivity by radical polymerization, it is difficult to introduce the hydrophobic units quantitatively by the radical polymerization. Accordingly, the obtained polymers result in inhomogeneous molecular weights and composition ratios, which give rise to the problem of impaired performance such as solubility to water, temperature-responsiveness, and the like.

In order to synthesize polymers having homogeneous molecular weights, composition ratios, and the like by co-polymerization of vinyl ether having a hydroxyl group and vinyl ether without a hydroxyl group, a method is known in which living cationic polymerization is performed by using a monomer by protecting a hydroxyl group with a protective reagent (a capping agent) and deprotection of the protective group is performed after polymerization.

However, the living cationic polymerization is normally performed under a low temperature of 0° C. or less and temperature control is not easy in an industrial scale due to the reaction heat and in addition, the reaction needs to be performed under an anhydrous state and in inert gas (Non Patent Document 1). Therefore, it is difficult to attain production in industrially low cost and of efficiency. Also, the method in which the monomer having a hydroxyl group subjected to capping is used requires a deprotection step of the capping agent after polymerization, which the deprotection is generally carried out with the use of acid or alkaline that needs to be removed in a removal step. Such increase in the number of steps will directly lead to the increase of manufacturing cost of the polymers.

As for the method for introducing the hydrophobic units, there can be considered, apart from those described above, for example, a method in which the side chain hydroxyl group after polymerization is partially reacted with the capping agent.

However, such method will require a capping step of the hydroxyl group, as well as the polymerization step, which is a drawback that increases the manufacturing cost of the polymers. Also, it is difficult to control the protection rate in the partial capping and to produce polymers having the same quality with good reproducibility in industrial terms and further, there is a concern that the protection rate changes due to, for example, hydrolysis of the capping agent depending on the storage conditions to affect the performance of, for example, solubility to water, temperature-responsiveness, and the like.

In the method of introducing the hydrophobic units, the hydrophobic unit itself is a disincentive of the solubility to water, the temperature-responsiveness, and the like and especially the low molecular weight compound is greatly susceptible to the hydrophobic unit in both methods; therefore, there is a limit in the method for suppressing the viscosity elevation due to the hydrogen bond by introducing the hydrophobic unit.

PRIOR ART REFERENCES

Patent Documents

[Patent Document 1] Japanese Patent Application Laid-Open Publication No. 2013-166829
[Patent Document 2] Japanese Patent Application Laid-Open Publication No. H5-086124
[Patent Document 3] Japanese Patent Application Laid-Open Publication No. H6-313004

Non Patent Documents

[Non Patent Document 1] Journal of Polymer Science Part A: Polymer Chemistry, vol. 41, pp. 3300-3312, 2003

SUMMARY OF THE INVENTION

Problems to be Solved by the Invention

The present invention has been made in consideration of the above-described current status and an object of the present invention is to provide a method for producing a vinyl ether polymer having a hydroxyl group on the side chain by radical polymerization of vinyl ether having a hydroxyl group only, wherein the vinyl ether polymer having a low viscosity and excellent workability and processability is produced in a simple and efficient manner.

Further, in the method of performing radical polymerization of vinyl ether having a hydroxyl group on the side chain by using an oil-soluble polymerization initiator, it was found, according to the investigation by the present inventors, that the temperature-responsiveness of the obtained polymer falls and the solubility against water under low temperature becomes low when the initiator was increased and the molecular weight of the polymer was lowered. This is considered due to the increase of the effect of the hydrophobic initiator terminal in the low molecular weight compound.

Therefore, in addition to the above description, the object of the present invention is also to provide a temperature-responsive polymer comprising a vinyl ether polymer having a hydroxyl group, the temperature-responsive polymer having an excellent temperature-responsiveness even with a low molecular weight.

Means for Solving the Problems

In order to solve the above-described problems, the present inventors intensively studied to find that radical polymerization of vinyl ether comprising a hydroxyl group under a specific polymerization solvent system and a specific initiator efficiently generates a vinyl ether polymer having a low molecular weight and low viscosity, and surprisingly that a temperature-responsive polymer exhibits a sharp temperature responsiveness even with a low molecular weight, thereby completing the present invention.

That is, the present invention provides a method for producing a vinyl ether polymer having a hydroxyl group on the side chain, characterized in that vinyl ether comprising a hydroxyl group is subjected to radical polymerization with an oil-soluble azo polymerization initiator, in the presence of a mixed solvent comprising water and an organic solvent selected from alcohol or cyclic ether.

The present invention also provides a temperature-responsive polymer mixture comprising a vinyl ether polymer which is a polymer of vinyl ether comprising a hydroxyl group, characterized in that it comprises:
(1) a vinyl ether polymer having an oxygen-containing group derived from an organic solvent selected from alcohol or cyclic ether on the polymer chain terminal; and
(2) a vinyl ether polymer having a terminal structure derived from an oil-soluble azo polymerization initiator on the polymer chain terminal.

Effect of the Invention

According to the present invention, there is provided a method for producing a vinyl ether polymer having a hydroxyl group on the side chain, the method which the vinyl ether polymer having a low viscosity and excellent processability and workability can be produced in a simple and efficient manner, and which allows to obtain the vinyl ether polymer having an excellent temperature responsiveness even with a low molecular weight.

Further, according to the present invention, there is provided a temperature-responsive polymer mixture comprising the vinyl ether polymer having a hydroxyl group on the side chain, which has an excellent temperature-responsiveness even with a low molecular weight.

MODE FOR CARRYING OUT THE INVENTION

The present invention is elucidated in details as follows.
<Method for Producing Vinyl Ether Polymer>
Vinyl ether having a hydroxyl group used in the method for producing a vinyl ether polymer according to the present invention may be appropriately selected depending on the purpose of the vinyl ether polymer, and preferred is vinyl ether represented by the following formula (1):

(1)

wherein $R^1$ represents an aliphatic hydrocarbon group having 1 to 10 carbons or a group removed of n+1 hydrogen atoms from straight-chain, branched-chain or cyclic ether having 3 to 7 carbons, wherein n is 1 to 5.

The aliphatic hydrocarbon group having 1 to 10 carbons represented by $R^1$ in formula (1) may be branched or comprise a cyclic structure and include an alkyl group which the valence is n+1 and having 1 to 10 carbons or a cycloaliphatic hydrocarbon group which the valence is n+1 and having 5 to 10 carbons.

Examples of an alkyl group which the valence is n+1 and having 1 to 10 carbons include a group removed of n+1 hydrogen atoms from a straight-chain or branched-chain alkane, such as methane, ethane, propane, n-butane, n-pentane, n-hexane, isobutene, isopentane, and neopentane.

Examples of a cycloaliphatic hydrocarbon group which the valence is n+1 and having 5 to 10 carbons include a monocyclic or a polycyclic cycloalkane having 5 to 10 carbons or a group removed of n+1 hydrogen atoms from the alkyl substituent thereof. The hydrogen atom to be removed may be of cycloalkane or of an adduct alkyl group. Particular examples include monocycloalkanes such as cyclopentane and cyclohexane or a group removed of n+1 hydrogen atoms from the alkyl substituent thereof; polycycloalkanes such as adamantine, norbornane, isobornane, tricyclo[5.2.1.0$^{2,6}$]decane, and decahydronaphtalene or a group removed of n+1 hydrogen atoms from the alkyl substituent thereof.

Examples of an alkyl group added to cycloalkanes may include an alkyl group having 1 to 5 carbons, specifically, methyl groups, ethyl groups, n-propyl groups, isopropyl groups, n-butyl groups, sec-butyl groups, tert-butyl groups, n-pentyl groups, neopentyl groups, and isoamyl groups. The number of substituents is not limited to 1 and when a plurality of substituents are included, they may be each the same or different.

Amongst these, preferred is a bivalent (n=1) alkyl group (an alkylene group) having 1 to 6 carbons and especially preferred is a straight-chain or branched-chain bivalent (n=1) alkyl group (an alkylene group) having 2 to 4 carbons, in view of the solubility against water and the temperature-responsiveness of the obtained polymer. Particular examples include methylene groups, ethylene groups, trimethylene groups, tetramethylene groups, pentamethylene groups, hexamethylene groups, methyl methylene groups, dimethyl methylene groups, methyl ethylene groups, ethyl methylene groups, ethyl ethylene groups, 1,2-dimethyl ethylene groups, 1-methyl trimethylene groups, 1-methyl tetramethylene groups, and 1,3-dimethyl trimethylene groups, and particularly preferred are straight-chain alkylene groups such as ethylene groups ($—CH_2CH_2—$), trimethylene groups ($—CH_2CH_2CH_2—$), and tetramethylene groups ($—CH_2CH_2CH_2CH_2—$).

Particular examples of the group removed of n+1 hydrogen atoms from a straight-chain, branched-chain or cyclic ether having 3 to 7 carbons represented by $R^1$ in formula (1) include a group removed of n+1 hydrogen atoms from a straight-chain or branched-chain ether such as methyl ethyl ether, diethyl ether, methyl propyl ether, methyl isopropyl ether, ethyl propyl ether, ethyl isopropyl ether, dipropyl ether, diisopropyl ether, methyl butyl ether, ethyl butyl ether, methyl sec-butyl ether, ethyl sec-butyl ether, methyl tert-butyl ether, and ethyl tert-butyl ether; a group removed of n+1 hydrogen atoms from a cyclic ether such as tetrahydrofuran and tetrahydropyran.

Amongst these, preferred is a bivalent (n=1) straight-chain or branched-chain alkoxyalkyl group having 3 to 7 carbons, in view of the solubility against water of the obtained polymer. Particular examples include ethylene oxy ethylene groups, tetramethylene oxy tetramethylene groups, and methyl ethylene oxy methyl ethylene groups, and especially preferred are ethylene oxy ethylene groups ($—CH_2CH_2OCH_2CH_2—$).

In view of low viscosity, the number of n of the hydroxyl group is preferably 1, 2 or 3, more preferably 1 or 2, and especially preferably 1.

Amongst vinyl ethers represented by formula (1) as above, specific examples of vinyl ether having one hydroxyl group include straight-chain hydroxyl alkyl vinyl ethers such as hydroxyl methyl vinyl ether, 1-hydroxyl ethyl vinyl ether, 3-hydroxyl propyl vinyl ether, 4-hydroxyl butyl vinyl ether, and 5-hydroxyl pentyl vinyl ether;

hydroxyl alkyl vinyl ethers such as 1-hydroxyl ethyl vinyl ether, 1-hydroxyl propyl vinyl ether, 2-hydroxyl propyl vinyl ether, 2-hydroxyl-1-methyl ethyl vinyl ether, 1-hydroxyl-1-methyl ethyl vinyl ether, 1-hydroxyl butyl vinyl ether, 2-hydroxyl butyl vinyl ether, 3-hydroxyl butyl vinyl ether, 3-hydroxyl-1-methyl propyl vinyl ether, 3-hydroxyl-2-methyl propyl vinyl ether, 2-hydroxyl-2-methyl propyl vinyl ether, 2-hydroxyl-1-methyl propyl vinyl ether, 1-hydroxylmethyl propyl vinyl ether, 2-hydroxyl-1,1-dimethyl ethyl vinyl ether, 1-hydroxyl-2-methyl propyl vinyl ether, 4-hydroxyl amyl vinyl ether, 3-hydroxyl amyl vinyl ether, 2-hydroxyl amyl vinyl ether, 4-hydroxyl-3-methyl butyl vinyl ether, and 3-hydroxyl-3-methyl butyl ether;

monocyclic hydroxyl cycloalkyl vinyl ethers such as 2-hydroxyl cyclopentyl vinyl ether, 3-hydroxyl cyclopentyl vinyl ether, 2-hydroxyl cyclohexyl vinyl ether, 3-hydroxyl cyclohexyl vinyl ether, 4-hydroxyl-cyclohexyl vinyl ether, 4-(hydroxyl methyl)cyclohexyl vinyl ether, 4-(2-hydroxyl ethyl)cyclohexyl vinyl ether, 2-hydroxyl cycloheptyl vinyl ether, 2-hydroxyl cyclooctyl vinyl ether, 4-hydroxyl cyclooctyl vinyl ether, and 2-hydroxyl cyclodecanyl vinyl ether;

polycyclic hydroxyl cycloalkyl vinyl ethers such as 3-hydroxyl-1-vinyl oxy adamantane, bicyclo[2.2.1]heptanediol monovinyl ether, tricyclo[5.2.1.0$^{2,6}$]decanediol monovinyl ether, and decalinediol monovinyl ether;

straight-chain or branched-chain hydroxyl alkoxy vinyl ethers such as 2-hydroxyl-1-methoxy ethyl vinyl ether, 1-hydroxyl-2-methoxy ethyl vinyl ether, 2-(hydroxyl methoxy)ethyl vinyl ether, 1-(hydroxyl methoxy)ethyl vinyl ether, diethylene glycol vinyl ether, dipropylene glycol vinyl ether, 3-hydroxyl-1-methoxypropyl vinyl ether, 3-hydroxyl-1-ethoxypropyl vinyl ether, 4-hydroxyl-1-ethoxybutyl vinyl ether, and 2-(2-hydroxyl ethyl)-1-methyl ethyl vinyl ether; and cyclic ethers having a hydroxyl group or a vinyloxy group such as 4-hydroxyl-3-vinyloxytetrahydrofuran, 4-hydroxyl-2-vinyloxytetrahydrofuran, and 4-hydroxyl-2-vinyloxytetrahydropyran.

Examples of vinyl ether having two hydroxyl groups include monovinyl ethers of trivalent alcohols such as glycerin, 1,2,3-butanetriol, 1,2,4-butanetriol, 2-methyl-1,2,3-propanetriol, 1,2,3-pentanetriol, 1,2,4-pentanetriol, 1,3,5-pentanetriol, 2,3,4-pentanetriol, 2-methyl-2,3,4-butanetriol, trimethylol ethane, 2,3,4-hexanetriol, 2-ethyl-1,2,3-butanetriol, trimethylol propane, 4-propyl-3,4,5-heptanetriol, and 2,4-dimethyl-2,3,4-pentanetriol.

Examples of vinyl ether having three hydroxyl groups include monovinyl ethers of quadrivalent alcohols such as erythritol, pentaerythritol, 1,2,3,4-pentatetrol, 2,3,4,5-hexatetrol, 1,2,4,5-pentanetetrol, 1,3,4,5-hexanetetrol, and diglycerin, sorbitan.

Examples of vinyl ether having four hydroxyl groups include monovinyl ethers of pentavalent alcohols such as adonitol, arabinitol, xylitol, and triglycerin.

Examples of vinyl ether having five hydroxyl groups include monovinyl ethers of hexavalent alcohols such as dipentaerythritol, sorbitol, mannitol, iditol, darcitol, and inositol.

Amongst these vinyl ethers, preferred is vinyl ether having one hydroxyl group in view of the low viscosity of the obtained polymer, and especially preferred are straight-chain or branched-chain hydroxyl alkyl vinyl ether and hydroxyl alkoxy alkyl vinyl ether in view of the temperature responsiveness and the solubility against water; preferably hydroxyl methyl vinyl ether, 2-hydroxyl ethyl vinyl ether, 2-hydroxyl propyl vinyl ether, 2-hydroxyl-1-methyl ethyl vinyl ether, 3-hydroxyl propyl vinyl ether, 4-hydroxyl butyl vinyl ether, 5-hydroxyl pentylvinyl ether, 3-hydroxyl-2-methyl-propylvinyl ether, 3-hydroxyl-3-methyl propyl vinyl ether, diethylene glycolvinyl ether, and dipropylene glycol vinyl ether, and especially preferably 2-hydroxyl ethyl vinyl ether, 3-hydroxyl propyl vinyl ether, 4-hydroxyl butyl vinyl ether, and diethylene glycolvinyl ether.

One kind of these vinyl ether comprising a hydroxyl group may be used alone or two or more kinds may be used in a combination and a vinyl ether polymer can be obtained which exhibits a temperature-responsiveness at a given temperature by random copolymerization of 2 or more vinyl ethers having a different hydrophilicity/hydrophobicity.

The production method of the present invention is also characterized in that radical polymerization is carried out in the presence of a mixed solvent comprising water and an organic solvent selected from alcohol or cyclic ether.

In the production method of the present invention, radical polymerization in the presence of water will allow polymerization with a high conversion rate of the monomers so that the amount of residual monomers in the vinyl ether polymer can be reduced. The conversion rate of the monomers (the average of the conversion rate when 2 or more monomers are used) is normally 95 mol % or more, more preferably 97 mol % or more, and further preferably 99 mol % or more.

A part of the organic solvent selected from alcohol or cyclic ether acts as a chain transfer agent, whereas the most part acts as a diluent together with water as described below. Therefore, the mixed solvent of water and an organic solvent is defined as a "polymerization solvent" in the present specification.

Water and the organic solvent do not have to be blended in the mixed solvent (the polymerization solvent) and neither the other components used for polymerization need to be completely dissolved or blended in the mixed solvent (the polymerization solvent). The insoluble components may be suspended or dispersed by process of stirring and the like.

Preferable alcohols are primary alcohols or secondary alcohols having 2 to 12 carbons and may be branched or may comprise a cyclic structure.

Particular examples include straight-chain primary alcohols such as ethanol, 1-propanol, 1-butanol, 1-pentanol, 1-hexanol, 1-heptanol, 1-octanol, 1-nonanol, 1-decanol, 1-undecanol, and 1-dodecanol;

branched primary alcohols such as isopropanol, 2-butanol, 2-pentanol, 3-pentanol, 2-methylbutanol, 3-methylbutanol, neopentanol, 2-hexanol, 2,2-dimethylbutanol, isooctanol, 2-ethylhexanol, 3,5,5-trimethyl-1-hexanol, isononanol, and isodecanol;

primary alcohols comprising a cyclic structure such as cyclopentanol, cyclohexanol, and cyclohexane methanol;

straight-chain or branched-chain secondary alcohols such as ethylene glycol, propylene glycol, trimethylene glycol, 1,3-butylene glycol, 1,4-butanediol, 1,6-hexanediol, diethylene glycol, dipropylene glycol, neopentyl glycol, triethylene glycol, 3-methyl pentanediol, heptanediol, octanediol, nonanediol, and decanediol; and secondary alcohols comprising a cyclic structure such as 1,2-cyclohexanediol, 1,4-cyclohexanediol, and 1,4-cyclohexanedimethanol.

Amongst these, in view of viscosity reduction and sensitization of the temperature-responsiveness of the obtained polymer, preferred are straight-chain or branched-chain primary alcohols or secondary alcohols having 2 to 12 carbons, more preferred are straight-chain or branched-chain primary alcohols or secondary alcohols having 3 to 10 carbons, and further preferred are secondary alcohols having 3 to 4 carbons, and in view of the solubility against water of the obtained polymer, especially preferred are water-soluble alcohols such as isopropyl alcohol (IPA) and propylene glycol (PG).

Examples of said cyclic ethers include of 4-, 5-, and 6-membered ring cyclic ethers. Particular examples include oxetane, tetrahydrofuran, tetrahydropyran, dioxane and the like. In view of viscosity reduction, sensitization of the temperature-responsiveness, and the solubility against water of the obtained polymer, especially preferred is tetrahydrofuran (THF).

One kind of these organic solvents may be used alone or 2 or more of these may be used in a combination.

The amount of the mixed solvent of water and organic solvent used is preferable when the total amount of water and the organic solvent is within the range of 10 to 1,000 parts by mass based on the total amount of vinyl ether of 100 parts by mass used for polymerization reaction, and more preferably within the range of 20 to 500 parts by mass, especially preferably within the range of 50 to 200 parts by mass. When the amount of the mixed solvent used is 10 parts by mass or more, polymerization reaction will be sufficiently progressed to enhance the conversion rate of the monomers; and when the amount of the mixed solvent used is 1,000 parts by mass or less, polymerization rate will be maintained while suppressing the cost for the solvent, so polymerization can be performed efficiently and economically.

The proportion of water and the organic solvent in the mixed solvent is preferable when the total amount of the organic solvent is within the range of 10 to 1,000 parts by mass based on 100 parts by mass of water, and more preferably within the range of 20 to 500 parts by mass, especially preferably within the range of 50 to 200 parts by mass.

The production method of the present invention is also characterized in that an oil-soluble azo polymerization initiator is used as a radical polymerization initiator. The use of the oil-soluble azo polymerization initiator allows suppression of sub-generation of polyacetal and the like, even when water was used as the solvent.

Further, since the oil-soluble azo polymerization initiator is insoluble or has a poor solubility to water (solubility to water is 10% by mass or less, preferably 5% by mass or less at 23° C.), the polymerization initiator is present in the polymerization system in a precipitated or phase-separated condition in the production method of the present invention in which water is used as the polymerization solvent. In the present invention, even though polymerization reaction was performed in such an inhomogeneous system, surprisingly, polymerization was possible with a higher conversion rate of the monomers as compared with, for example, polymerization in which only alcohol was used as the polymerization solvent to completely dissolve the oil-soluble azo polymerization initiator.

Particular examples of the oil-soluble azo polymerization initiators include nitrile type azo compounds such as 2,2'-azobisisobutyronitrile, 2,2'-azobis(2-methylbutyronitrile), 2,2'-azobis(2,4-dimethylvaleronitrile), 2,2-azobis(4-methoxy-2,4-dimethylvaleronitrile), and 1,1'-azobis(cyclohexane-1-carbonitrile);

ester type azo compounds such as dimethyl2,2'-azobis(2-methyl propionate)(MAIB), dimethyl2,2'-azobis(2-methyl butyrate), and dimethyl2,2'-azobis(2-methyl pentanoate); and acid amide type azo compounds such as 2,2'-azobis(N-butyl-2-methyl propionamide), 2,2'-azobis[N-(2-propenyl)-2-methyl propionamide], and 2,2'-azobis[2-methyl-N-(2-hydroxylethyl) propionamide.

Amongst these, preferred are ester type azo compounds in view of reactivity under the presence of water, and especially preferred is dimethyl2,2'-azobis(2-methyl propionate) (MAIB).

One kind of the polymerization initiators may be used alone, or two or more kinds may be used in a combination. The amount of polymerization initiator used cannot be limited uniformly since it varies depending on the reaction temperature, the kind of initiator, the kind and composition of vinyl ether, the molecular weight of the obtained polymer, and the like; preferred amount is from 1 to 50 parts by mass and especially preferred is from 10 to 50 parts by mass, based on the total amount of 100 parts by mass of vinyl ether.

The polymerization temperature may be appropriately selected, depending on the kind of polymerization initiator, and polymerization may be performed by changing the temperature step-by-step. Generally, the temperature is preferably within the range from 50 to 180° C. and especially preferably within the range from 60 to 170° C. When the reaction temperature is 50° C. or more, the reaction rate is maintained; and when the reaction temperature is 180° C. or less, degradation of the polymerization initiator is suppressed so efficient polymerization is attained.

The molecular weight and the molecular weight distribution of the vinyl ether polymer obtained in accordance with the production method of the present invention may be appropriately determined in accordance with the purposes, and without particular limitation, preference is made when the number average molecular weight (Mn) is within the range of 500 to 10,000, more preference made within the range from 600 to 6,000, more preference made within the range from 1,000 to 5,000, and especial preference made within the range from 1,500 to 3,000, in view of the low viscosity. The weight average molecular weight (Mw) is preferably within the range of 1,000 to 10,000, preferably within the range from 2,000 to 8,000, and further preferably within the range from 3,000 to 6,000. Moreover, in view of sensitization of the temperature-responsiveness, the molecular weight distribution (Mw/Mn) is preferably less than 2.0 and more preferably 1.9 or less. Further, also in view of the low viscosity, the molecular weight distribution (Mw/Mn) is preferably 1.5 or more and more preferably 1.6 or more.

The number average molecular weight (Mn) and the weight average molecular weight (Mw) as used herein are values measured by GPC (gel permeation chromatography), which can be measured in accordance with the measuring conditions to be described below.

In accordance with the production method according to the present invention, a vinyl ether polymer can be obtained having a lower viscosity as compared with vinyl ether polymers obtained in conventional production methods.

Although the viscosity of the vinyl ether polymer cannot be prescribed uniformly since it varies depending on the kind or the molecular weight of vinyl ether, the viscosity is preferably within the range from 500 to 10,000 mPa·s, more preferably within the range from 500 to 7,000 mPa·s, further preferably within the range from 500 to 5,000 mPa·s, further more preferably within the range from 500 to 3,000 mPa·s, and especially preferably within the range from 500 to 2,000 mPa·s, when measured at room temperature (25° C.) as a 80% by mass polymer solution.

In radical polymerization of vinyl ether having a hydroxyl group, since propagating radicals are unstable and high in reactivity, it is considered that chain transfer reaction tends to occur against every chemical species in the polymerization system and that chain transfer reaction tends to occur against polymerization solvents with a high concentration. Since a mixed solvent of water and organic solvent is used as the polymerization solvent in the production method of the present invention, a part of the organic solvent is incorporated into the polymer as an initiator terminal by chain transfer so that a polymer is obtained having a hydroxyl group of alcohol or an oxygen atom of cyclic ether at the polymer chain terminal. It is considered that these oxygen atom-containing groups have an ability to form hydrogen bonds themselves while allowing the hydrogen bonds to reduce that act between the hydroxyl groups on the side chain of the vinyl ether polymer, whereby the viscosity of the vinyl ether polymer can be reduced.

The vinyl ether polymer obtained in accordance with the production method of the present invention can be used as a water-soluble polymer or a temperature-responsive polymer. The water-soluble polymer dissolves in water of all temperature range (0 to 100° C.), and a temperature-responsive polymer becomes hydrophilic at a temperature lower than the Lower Critical Solution Temperature (LCST) to dissolve in water while at a temperature higher than the LCST, the temperature-responsive polymer becomes hydrophobic to aggregate. Such properties are commonly known for the vinyl ether polymer comprising a hydroxyl group on the side chain.

In the production method according to the present invention, substantially, a mixture is obtained of a polymer having a terminal structure derived from an organic solvent and a polymer having a terminal structure derived from an initiator by chain transfer to the organic solvent. Surprisingly, although there are polymers having various terminal structures mingled, said polymer mixture exhibits a sharp temperature-responsiveness even in a low molecular weight compound which is susceptible to the terminal structure. More surprisingly, in the present invention, a temperature-responsive polymer having a sharp temperature-responsiveness can be obtained likewise regardless whether a hydrophilic or a hydrophobic organic solvent was used. When a strong hydrophobic organic solvent was used, it is also possible to reduce the response temperature (LCST) of the obtained polymer.

The effect of the present invention is significant especially in the production of a vinyl ether polymer that is formed in low molecular weight, and the vinyl ether polymer obtained from the production method of the present invention can be suitably used when especially a polymer having a low molecular weight and a low viscosity is required in the water-soluble polymer or the temperature-responsive polymer applications. Examples of such applications include ink, water-based paints, dispersants, and the like.

<Temperature-Responsive Polymer Mixture>

Next, the temperature-responsive polymer invention of the present invention is described.

The temperature-responsive polymer mixture comprises a vinyl ether polymer which is a polymer of vinyl ether comprising a hydroxyl group and characterized in that it comprises:
(1) a vinyl ether polymer having an oxygen-containing group on the polymer chain terminal, derived from an organic solvent selected from alcohol or cyclic ether; and
(2) a vinyl ether polymer having a terminal structure derived from an oil-soluble azo polymerization initiator on the polymer chain terminal.

Particular examples of the oxygen containing group derived from the organic solvent include an alcoholic hydroxyl group or cyclic ether. Suitable examples of the terminal structure of the oil-soluble azo polymerization initiator include esters.

As for vinyl ether comprising a hydroxyl group, the organic solvent selected from alcohol or cyclic ether, and the oil-soluble azo polymerization initiator, those can be applied which are described in <Method for Producing Vinyl Ether Polymer> of the present invention.

As for the above-described vinyl ether, preferred is vinyl ether having one hydroxyl group in view of the low viscosity of the obtained polymer, and especially preferred are straight-chain or branched-chain hydroxyl alkyl vinyl ether and hydroxyl alkoxy alkyl vinyl ether in view of the temperature responsiveness; preferably hydroxylmethylvinyl ether, 2-hydroxyl ethyl vinyl ether, 2-hydroxyl propyl vinyl ether, 2-hydroxyl-1-methyl ethyl vinyl ether, 3-hydroxyl propyl vinyl ether, 4-hydroxyl butyl vinyl ether, 5-hydroxyl pentylvinyl ether, 3-hydroxyl-2-methyl-propylvinyl ether, 3-hydroxyl-3-methyl propyl vinyl ether, diethylene glycolvinyl ether, and dipropylene glycolvinyl ether, and especially preferably 2-hydroxyl ethyl vinyl ether, 3-hydroxyl propyl vinyl ether, 4-hydroxyl butyl vinyl ether, and diethylene glycolvinyl ether.

One kind of such vinyl ethers comprising a hydroxyl group may be used alone or 2 kinds or more may be used in a combination, and a vinyl ether polymer can be obtained which exhibits a temperature-responsiveness at a given temperature by random copolymerization of 2 or more vinyl ethers having a different hydrophilicity/hydrophobicity (e.g., hydroxyl alkyl vinyl ether and hydroxyl alkoxyalkyl vinyl ether)

As for said alcohol, preference is made to straight-chain or branched-chain primary or secondary alcohols having 2 to 12 carbons, and more preference to straight-chain or branched-chain primary or secondary alcohols having 3 to 10 carbons, further preference to secondary alcohols having 3 to 4 carbons, in view of viscosity reduction and sensitization of the temperature-responsiveness of the obtained polymer, and in view of the solubility to water of the obtained polymer, especial preference is made to water-soluble alcohols such as isopropyl alcohol (IPA), propylene glycol (PG), and the like. As for said cyclic ether, preference is made to tetrahydrofuran (THF), in view of viscosity reduction, sensitization of the temperature-responsiveness, and the solubility to water. As for said oil-soluble azo polymerization initiator, preferred are ester type azo compounds and especially preferred is MAIB.

The mixing ratio of the polymer having an organic solvent-derived structure at the polymer chain terminal and the polymer having an initiator-derived structure at the polymer chain terminal is not particularly limited, and generally, the ratio of the polymer having an organic solvent-derived structure at the polymer chain terminal is 1 to 99% by mass to 99 to 1% by mass of the polymer having an initiator-derived structure at the polymer chain terminal, preferably the polymer having an organic solvent-derived structure at the polymer chain terminal is 3 to 97% by mass to 97 to 3% by mass of the polymer having an initiator-derived structure at the polymer chain terminal, and more preferably the polymer having an organic solvent-derived structure at the polymer chain terminal is 5 to 95% by mass to 95 to 5% by mass of the polymer having an initiator-derived structure at the polymer chain terminal.

The molecular weight and the molecular weight distribution of the temperature-responsive polymer mixture of the present invention may be appropriately selected depending on the application and without particular limitation, preference is made when the number average molecular weight (Mn) is within the range of 500 to 10,000, more preference made within the range from 600 to 6,000, more preference made within the range from 1,000 to 5,000, and especial preference made within the range from 1,500 to 3,000, in view of the low viscosity. The weight average molecular weight (Mw) is preferably within the range of 1,000 to 10,000, preferably within the range from 2,000 to 8,000, and further preferably within the range from 3,000 to 6,000. Moreover, in view of sensitization of the temperature-responsiveness, the molecular weight distribution (Mw/Mn) is preferably less than 2.0 and more preferably 1.9 or less. Further, also in view of the low viscosity, the molecular weight distribution (Mw/Mn) is preferably 1.5 or more and more preferably 1.6 or more.

The vinyl ether polymer of the present invention is characterized in that it exhibits a low viscosity due to the specific terminal oxygen containing group of the present invention. Although the viscosity of the vinyl ether polymer cannot be prescribed uniformly since it varies depending on the kind or the molecular weight of vinyl ether, the viscosity is preferably within the range from 500 to 10,000 mPa·s, more preferably within the range from 500 to 7,000 mPa·s, further preferably within the range from 500 to 5,000 mPa·s, further more preferably within the range from 500 to 3,000 mPa·s, and especially preferably within the range from 500 to 2,000 mPa·s, when measured at room temperature (25° C.) as 80% by mass polymer solution.

Further, although the temperature-responsive polymer mixture of the present invention is a mixture of polymers of a low molecular weight compound and different terminal structures, it is characterized in that surprisingly, a sharp temperature-responsiveness is exhibited.

For example, as it will be shown in the Examples to be described below, when the vinyl ether polymer represented by the above-described formula (1) is a homopolymer of one vinyl ether, the difference between the temperature when transmission against light having a wave length of 750 nm reaches 95% and the temperature when said transmission reaches 50% when 1% by mass polymer aqueous solution is heated (ΔT) is less than 7° C.; and even in the case of a random copolymer of 2 kinds or more of vinyl ether represented by the above-described formula (1), said temperature difference (ΔT) is less than 12° C., which both cases allow change in the hydrophilicity/hydrophobicity with a smaller temperature difference as compared with the case without the vinyl ether polymer having a specific oxygen-containing group of the present invention at the terminal.

The temperature-responsive polymer mixture of the present invention is obtained by radical polymerization of said vinyl ether in the presence of said organic solvent and said oil-soluble azo polymerization initiator. Also, a simple and efficient production is possible by applying the method as described in <Method for Producing Vinyl Ether Polymer> of the present invention.

The vinyl ether polymer of the present invention can be suitably used when especially a polymer having a low molecular weight and a low viscosity is required in the temperature-responsive polymer applications. Examples of such applications include ink, water-based paints, dispersants, and the like.

EXAMPLES

The present invention will be elaborated below with the aid of Examples and Comparative Examples; however, the present invention shall not be limited and construed by the disclosure of the following Examples.

In the Examples, analyses on the monomer conversion rate and physicality evaluations of the obtained vinyl ether polymers were carried out by the following method.
(1) The monomer conversion rate was analyzed by using gas chromatography (GC).
(2) The number average molecular weight (Mn), the weight average molecular weight (Mw), and the molecular weight distribution (Mw/Mn) were analyzed by gel permeation chromatography (GPC). The molecular weight was measured by converting the hydroxyl group of the vinyl ether polymer into an acetyl group.
(GPC Conditions)
Column: Shodex GPC LF804×3 (manufactured by Showa Denko K.K.)
Solvent: Tetrahydrofuran
Measurement Temperature: 40° C.
Flow Rate: 1.0 ml/min
Standard Curve: Standard Polyethylene Standard
(3) Viscosity was measured on 80% by mass polymer aqueous solution by using an EMS viscometer (manufactured by Kyoto Electronics Manufacturing Co., Ltd., Part number: EMS-1000) at a temperature of 25° C.
(4) Temperature-responsiveness was evaluated by measuring the change of transmission in the wave length of 750 nm of 1.0% by mass polymer aqueous solution. Measurement was carried out by using an ultra violet-visible spectrophotometer (manufactured by JASCO Corporation, Part number: V-650) and the temperature was determined as LCST when the differential curve of the light beam transmission becomes the maximum by elevating or lowering the temperature from 25° C. to 85° C. As an index for the sharpness of the responsiveness, ΔT was calculated from the following formula.

$$\Delta T(° C.)=(\text{temperature when transmission is 50\%})-(\text{temperature when transmission is 95\%})$$

(5) The polymer terminal structure was confirmed by mass spectrometry by lazer desorption ionization of the ionization method (device: manufactured by Shimadzu Corporation, Part number: AXIMA-TOF2, lazer: N2 lazer, measuring mode: cation, matrix reagent: DHB, cationization agent: sodium trifluoroacetate).

Example 1: Production of Poly(4-hydroxylbutyl Vinyl Ether) (1) (Polymerization Solvent: 2-propanol/water)

In to a 200 mL three neck flask with a reflux tube and a mechanical stirrer were added 80 g of 4-hydroxybutyl vinyl ether (manufactured by Maruzen Petrochemical Co., Ltd., hereinafter referred to as "HBVE") and 35.5 g of MAIB (an ester type azo compound, manufactured by Wako Pure Chemical Corporation, Product name: V-601), and further a mixed solvent of 2-propanol (IPA) and water (IPA/water=1/1, mass ratio) as a polymer solvent was added and dissolved until HBVE concentration reached 50% by mass. Then nitrogen was blown into the flask to deoxidize. After deoxidization, polymerization reaction was initiated in an oil bath of 70° C. under nitrogen atmosphere. After 10 hours, cooling and exposure to air were performed to stop polymerization and GC and GPC analyses were performed. As a result, the monomer conversion rate after 10 hours was 99 mol % or more, and the obtained polymer had a number average molecular weight of 2140 and a molecular weight distribution Mw/Mn of 1.71.

The polymer solvent was removed by evaporation and 12 hours of drying was conducted in a reduced pressure dryer of 90° C. to obtain 84.4 g of a liquid polymer. According to mass spectrometry conducted on the obtained polymer by Matrix Assisted Laser Desorption Ionization Method, there were confirmed a mass spectrum peak corresponding to the polymer kind having an IPA-derived terminal structure and a mass spectrum peak corresponding to the polymer kind having a MAIB-derived terminal structure.

Figure 1:
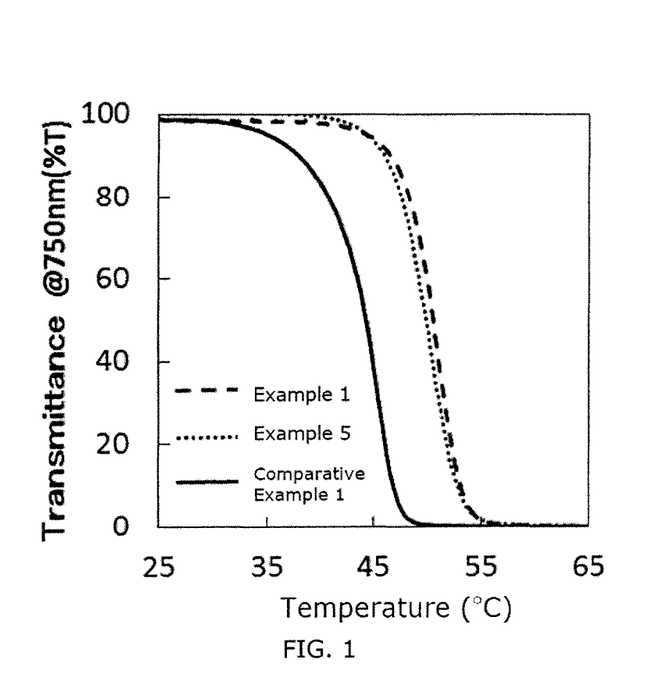
FIG. 1 shows the temperature-responsiveness of poly(4-hydroxybutylvinylether) obtained in Examples 1 and 5 and Comparative Example 1.

The results for the viscosity measurement and the temperature-responsiveness evaluation of the obtained polymer are shown in Table 1. In addition, the change in transmission in the temperature-responsiveness evaluation is shown in FIG. 1.

Example 2: Production of Poly(4-hydroxylbutyl Vinyl Ether) (2) (Polymerization Solvent: 1-hexanol/water)

Polymerization was carried out by similar operation to Example 1 except that the polymerization solvent was changed to a mixed solvent of 1-hexanol and water (1-hexanol/water=1/1, mass ratio). As a result, the monomer conversion rate after 10 hours was 99 mol % or more, and the obtained polymer had a number average molecular weight of 2200 and a molecular weight distribution Mw/Mn of 1.73.

The polymer solvent was removed by evaporation and 12 hours of drying was conducted in a reduced pressure dryer of 90° C. to obtain 93.8 g of a liquid polymer. According to mass spectrometry conducted the obtained polymer by Matrix Assisted Laser Desorption Ionization Method, there were confirmed a mass spectrum peak corresponding to the polymer kind having a 1-hexanol-derived terminal structure and a mass spectrum peak corresponding to the polymer kind having a MAIB-derived terminal structure.

The results for the viscosity measurement and the temperature-responsiveness evaluation of the obtained polymer are shown in Table 1.

Example 3: Production of Poly(4-hydroxylbutyl Vinyl Ether) (3) (Polymerization Solvent: 1-decanol/water)

Polymerization was carried out by similar operation to Example 1 except that the polymerization solvent was changed to a mixed solvent of 1-decanol and water (1-decanol/water=1/1, mass ratio). As a result, the monomer conversion rate after 10 hours was 97 mol % or more, and the obtained polymer had a number average molecular weight of 2820 and a molecular weight distribution Mw/Mn of 1.68.

The polymer solvent was removed by evaporation and 12 hours of drying was conducted in a reduced pressure dryer of 90° C. to obtain 93.4 g of a liquid polymer. According to mass spectrometry conducted on the obtained polymer by Matrix Assisted Laser Desorption Ionization Method, there were confirmed a mass spectrum peak corresponding to the polymer kind having a 1-decanol-derived terminal structure and a mass spectrum peak corresponding to the polymer kind having a MAIB-derived terminal structure.

The results for the viscosity measurement and the temperature-responsiveness evaluation of the obtained polymer are shown in Table 1.

Example 4: Production of Poly(4-hydroxylbutyl Vinyl Ether) (4) (Polymerization with a Mixed Solvent System of Propylene Glycol/Water)

Polymerization was carried out by similar operation to Example 1 except that the polymerization solvent was changed to a mixed solvent of propylene glycol (PG) and water (PG/water=1/1, mass ratio). As a result, the monomer conversion rate after 10 hours was 99 mol % or more, and the obtained polymer had a number average molecular weight of 2830 and a molecular weight distribution Mw/Mn of 1.87.

The polymer solvent was removed by evaporation and 12 hours of drying was conducted in a reduced pressure dryer of 90° C. to obtain 124.5 g of a liquid polymer. According to mass spectrometry conducted on the obtained polymer by Matrix Assisted Laser Desorption Ionization Method, there were confirmed a mass spectrum peak corresponding to the polymer kind having a THF-derived terminal structure and a mass spectrum peak corresponding to the polymer kind having a MAIB-derived terminal structure.

The results for the viscosity measurement and the temperature-responsiveness evaluation of the obtained polymer are shown in Table 1. In addition, the change in transmission in the temperature-responsiveness evaluation is shown in FIG. 1.

Comparative Example 1: Production of Poly(4-hydroxylbutyl Vinyl Ether) (6) (Polymerization Solvent: Water)

Polymerization was carried out by similar operation to Example 1 except that the polymerization solvent was changed to water only. As a result, the monomer conversion rate after 10 hours was 99 mol % or more, and the obtained polymer had a number average molecular weight of 2990 and a molecular weight distribution Mw/Mn of 2.05.

The polymer solvent was removed by evaporation and 12 hours of drying was conducted in a reduced pressure dryer of 90° C. to obtain 90.5 g of a liquid polymer.

The results for the viscosity measurement and the temperature-responsiveness evaluation of the obtained polymer are shown in Table 1. In addition, the change in transmission in the temperature-responsiveness evaluation is shown in FIG. 1.

TABLE 1

| | Polymerization Solvent | Molecular Weight | | | Viscosity (80%) mPa·s | Responsive Temperature °C. | ΔT °C. |
| --- | --- | --- | --- | --- | --- | --- | --- |
| | | Mn | Mw | Mw/Mn | | | |
| Example 1 | IPA/Water | 2140 | 3660 | 1.71 | 2690 | 45.8 | 6.1 |
| Example 2 | Hexanol/Water | 2200 | 3810 | 1.73 | 1900 | 45.0 | 5.5 |
| Example 3 | Decanol/Water | 2820 | 4740 | 1.68 | 725 | <25.0 | 5.6 |
| Example 4 | PG/Water | 2830 | 5290 | 1.87 | 1920 | 42.3 | 4.3 |
| Example 5 | THF/Water | 1800 | 3240 | 1.80 | 1330 | 44.6 | 5.6 |
| Comparative Example 1 | Water | 2990 | 6130 | 2.05 | 5520 | 38.6 | 9.3 |

Matrix Assisted Laser Desorption Ionization Method, there were confirmed a mass spectrum peak corresponding to the polymer kind having a PG-derived terminal structure and a mass spectrum peak corresponding to the polymer kind having a MAIB-derived terminal structure.

The results for the viscosity measurement and the temperature-responsiveness evaluation of the obtained polymer are shown in Table 1.

Example 5: Production of Poly(4-hydroxylbutyl Vinyl Ether) (5) (Polymerization Solvent: tetrahydrofuran/water)

Polymerization was carried out by similar operation to Example 1 except that the polymerization solvent was changed to a mixed solvent of tetrahydrofuran (THF) and water (THF/water=1/1, mass ratio). As a result, the monomer conversion rate after 10 hours was 99 mol % or more, and the obtained polymer had a number average molecular weight of 1800 and a molecular weight distribution Mw/Mn of 1.80.

The polymer solvent was removed by evaporation and 12 hours of drying was conducted in a reduced pressure dryer of 90° C. to obtain 94.6 g of a liquid polymer. According to mass spectrometry conducted on the obtained polymer by Example 6: Production of 4-hydroxylbutyl Vinyl ether-r-diethylene Glycol Vinyl Ether Copolymer (1) (Polymerization Solvent: 2-propanol/water)

Polymerization was carried out by similar operation to Example 1 except that 143.8 g of HBVE and 41.1 g of diethylene glycol vinyl ether (manufactured by Maruzen Petrochemical Co., Ltd., hereinafter referred to as "DEGV") were used as vinyl ether (HBVE/DEGV=8/2, molar ratio). As a result, the monomer conversion rate after 10 hours was 99.5 mol % in the average of HBVE and DEGV, and the obtained polymer had a number average molecular weight Mn of 2090 and a molecular weight distribution Mw/Mn of 1.86.

Figure 2:
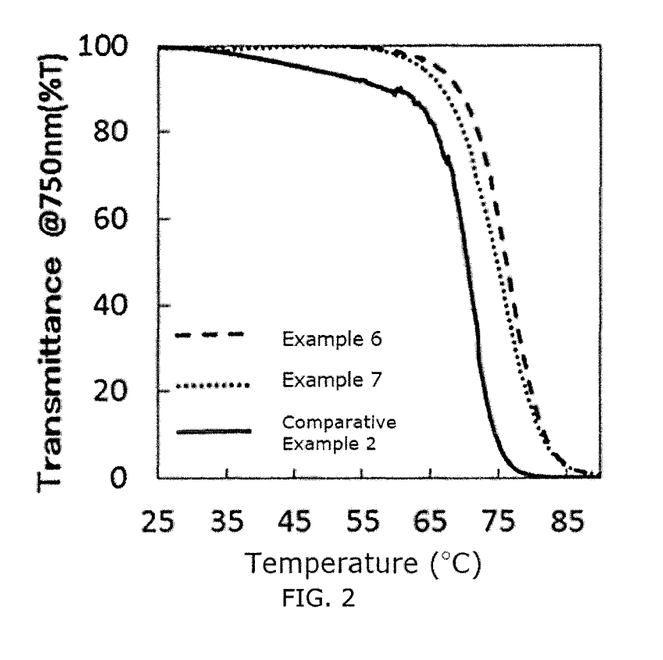
FIG. 2 shows the temperature-responsiveness of poly4-hydroxybutylvinylether-r-diethylene glycol vinyl ether copolymer obtained in Examples 6 and 7 and Comparative Example 2.

The polymer solvent was removed by evaporation and 12 hours of drying was conducted in a reduced pressure dryer of 90° C. to obtain 215.2 g of a liquid polymer. The results for the viscosity measurement and the temperature-responsiveness evaluation of the obtained polymer are shown in Table 2. In addition, the change in transmission in the temperature-responsiveness evaluation is shown in FIG. 2.

Example 7: Production of 4-hydroxylbutyl Vinyl ether-r-diethylene Glycol Vinyl Ether Copolymer (2) (Polymerization Solvent: THF/Water)

Polymerization was carried out by similar operation to Example 6 except that the polymerization solvent was changed to a mixed solvent of THF and water (THF/water=1/1, mass ratio). As a result, the monomer conversion rate after 10 hours was 98.1 mol % in the average of HBVE and DEGV, and the obtained polymer had a number average molecular weight Mn of 1890 and a molecular weight distribution Mw/Mn of 1.89.

The polymer solvent was removed by evaporation and 12 hours of drying was conducted in a reduced pressure dryer of 90° C. to obtain 216.3 g of a liquid polymer. The results for the viscosity measurement and the temperature-responsiveness evaluation of the obtained polymer are shown in Table 2. In addition, the change in transmission in the temperature-responsiveness evaluation is shown in FIG. 2.

Comparative Example 2: Production of 4-hydroxylbutyl Vinyl ether-r-diethylene Glycol Vinyl Ether Copolymer (3) (Polymerization Solvent: Water Only)

Polymerization was carried out by similar operation to Example 6 except that the polymerization solvent was changed to water only. As a result, the monomer conversion rate after 10 hours was 98.9 mol % in the average of HBVE and DEGV, and the obtained polymer had a number average molecular weight Mn of 2800 and a molecular weight distribution Mw/Mn of 1.73.

The polymer solvent was removed by evaporation and 12 hours of drying was conducted in a reduced pressure dryer of 90° C. to obtain 215.5 g of a liquid polymer. The results for the viscosity measurement and the temperature-responsiveness evaluation of the obtained polymer are shown in Table 2. In addition, the change in transmission in the temperature-responsiveness evaluation is shown in FIG. 2.

Comparative Example 3: Production of 4-hydroxylbutyl Vinyl ether-r-diethylene Glycol Vinyl Ether Copolymer (4) (Polymerization Solvent: IPA Only)

Polymerization was carried out by similar operation to Example 6 except that the polymerization solvent was changed to IPA only. As a result, the monomer conversion rate after 10 hours was 92.1 mol % in the average of HBVE and DEGV, and the obtained polymer had a number average molecular weight Mn of 1800 and a molecular weight distribution Mw/Mn of 1.55.

The polymer solvent was removed by evaporation and 12 hours of drying was conducted in a reduced pressure dryer of 90° C. to obtain 204.5 g of a liquid polymer. The results for the viscosity measurement and the temperature-responsiveness evaluation of the obtained polymer are shown in Table 2.

TABLE 2

| Polymerization Solvent | Molecular Weight | | | Viscosity (80%) mPa·s | Responsive Temperature ° C. | ΔT ° C. |
|---|---|---|---|---|---|---|
| | Mn | Mw | Mw/Mn | | | |
| Example 6 IPA/Water | 2090 | 3890 | 1.86 | 1380 | 68 | 10 |
| Example 7 THF/Water | 1890 | 3570 | 1.89 | 1180 | 66 | 11 |
| Comparative Example 2 Water | 2800 | 4840 | 1.73 | 2230 | 64 | 24 |
| Comparative Example 3 IPA | 1800 | 2790 | 1.55 | 1580 | 65 | 8 |

As shown in Tables 1 and 2, the molecular weight and the viscosity increases when water was only used as the polymerization solvent (Comparative Examples 1 and 2), whereas the vinyl ether polymers synthesized by the production method of the present invention allow the molecular weight to be suppressed low by making changes in the various solvents and also reduce the viscosity. When an organic solvent having a large number of carbons and strong hydrophobicity is used, it is also possible to lower the responsive temperature (LCST) (Example 3).

As shown in Comparative Example 3, when radical polymerization of vinyl ether having a hydroxyl group was carried out by using only an organic solvent (IPA) as the polymerization solvent, it was possible to carry out polymerization reaction with the polymerization initiator (MAIB) in a completely dissolved state; however, the monomer conversion rate was extremely low and the industrial productivity was also low. In contrast, the production method of the present invention allows efficient production of the vinyl ether polymer with a high monomer conversion rate, having a low molecular weight, a low viscosity, and a sharp temperature-responsiveness, despite that polymerization was performed in a precipitated state of the polymerization initiator (MAIB).

As shown in Table 1 and FIG. 1, when the aqueous solution of the homopolymer of HBVE showing temperature-responsiveness was heated, the temperature difference (ΔT) when the transmission of light varies from 95% to 50% generally exceeds 9° C. for the vinyl ether polymer formed by polymerization using only water as the polymerization solvent (Comparative Example 1); whereas for the vinyl ether polymers obtained by the production method of the present invention (Examples 1 and 5), the temperature difference was less than 7° C., showing an extremely sharp temperature responsiveness.

Further, as shown in Table 2 and FIG. 2, the HBVE/DEGV copolymers tended to have a wider responsive temperature range, and ΔT for the vinyl ether polymer formed by polymerization using only water as the polymerization solvent (Comparative Example 2) exceeded 22° C., whereas ΔT for the vinyl ether polymers obtained by the production method of the present invention (Examples 6 and 7) improved to less than 12° C.

In addition, as confirmed by the Matrix Assisted Laser Desorption Ionization Method in Examples 1 to 5, the homopolymers of HBVE obtained by the method of the present invention are mixtures of the vinyl ether polymers having the terminal structures derived from the organic solvents and the vinyl ether polymers having the terminal structures derived from the initiators. These polymer mixtures showed lower viscosity and sharper temperature-responsiveness as compared with those without the vinyl ether polymer having the terminal structure derived from the organic solvent as shown in Comparative Example 1.

On the other hand, no terminal structure was identified in the HBVE/DEGV copolymers as shown in Examples 6 and 7 by the Matrix Assisted Laser Desorption Ionization Method since the mass spectra were complex; however, lower viscosity and sharper temperature-responsiveness were exhibited, as compared with those without the vinyl ether polymer having the terminal structure derived from the organic solvent as shown in Comparative Example 2, thus it is assumed that the terminal structures derived from the organic solvents were introduced into the polymer chain terminals as like the homopolymers.

The invention claimed is:

1. A method for producing a vinyl ether polymer having a hydroxyl group on a side chain, comprising a step of
subjecting a vinyl ether comprising a hydroxyl group to radical polymerization by using an oil-soluble azo polymerization initiator, in the presence of a mixed solvent comprising water and an organic solvent selected from alcohol or cyclic ether, and wherein a monomer conversion rate is 95% or more.

2. The method for producing a vinyl ether polymer according to claim 1, wherein
the vinyl ether comprising a hydroxyl group is one or two or more kinds of vinyl ether represented by the following formula (1):

$$H_2C=CH-O-(R^1O)_n-H \quad (1)$$

wherein $R^1$ represents an aliphatic hydrocarbon group having 1 to 10 carbons or a group removed of n+1 hydrogen atoms from straight-chain, branched-chain or cyclic ether having 3 to 7 carbons, wherein n is 1 to 5.

3. The method for producing a vinyl ether polymer according to claim 1, wherein
the vinyl ether comprising a hydroxyl group is one or two or more kinds of vinyl ether selected from the group consisting of 2-hydroxyl ethyl vinyl ether, 3-hydroxyl propyl vinyl ether, 4-hydroxyl butyl vinyl ether, and diethylene glycol vinyl ether.

4. The method for producing a vinyl ether polymer according to claim 1, wherein
the organic solvent is primary alcohol or secondary alcohol having 2 to 12 carbons, or tetrahydrofuran.

5. The method for producing a vinyl ether polymer according to claim 1, wherein
the oil-soluble azo polymerization initiator is an azo ester compound.

6. The method for producing a vinyl ether polymer according to claim 1, wherein
the vinyl ether polymer has a number average molecular weight (Mn) within a range from 500 to 10,000.

7. The method for producing a vinyl ether polymer according to claim 1, wherein
the vinyl ether polymer has a viscosity within a range from 500 to 10,000 mPa·s when measured as 80% by mass polymer solution at 25° C.

8. A temperature-responsive polymer mixture comprising a vinyl ether polymer, the vinyl ether polymer being a polymer of vinyl ether comprising a hydroxyl group, wherein
the temperature-responsive polymer mixture comprises:
(1) a vinyl ether polymer having an oxygen-containing group derived from an organic solvent selected from alcohol or cyclic ether on the polymer chain terminal; and
(2) a vinyl ether polymer having a terminal structure derived from an oil-soluble azo polymerization initiator on the polymer chain terminal.

9. The temperature-responsive polymer mixture according to claim 8, wherein
the oxygen-containing group derived from an organic solvent is an alcoholic hydroxyl group or cyclic ether, and the terminal structure derived from an oil-soluble azo polymerization initiator is ester.

10. The temperature-responsive polymer mixture according to claim 8, wherein
the vinyl ether is one or two or more kinds of vinyl ether represented by the following formula (1):

$$H_2C=CH-O-(R^1O)_n-H \quad (1)$$

wherein $R^1$ represents an aliphatic hydrocarbon group having 1 to 10 carbons or a group removed of n+1 hydrogen atoms from straight-chain, branched-chain or cyclic ether having 3 to 7 carbons, wherein n is 1 to 5.

11. The temperature-responsive polymer mixture according to claim 8, wherein
the vinyl ether comprising a hydroxyl group is one or two or more kinds of vinyl ether selected from the group consisting of 2-hydroxyl ethyl vinyl ether, 3-hydroxyl propyl vinyl ether, 4-hydroxyl butyl vinyl ether, and diethylene glycol vinyl ether.

12. The temperature-responsive polymer mixture according to claim 8, wherein
the organic solvent is primary alcohol or secondary alcohol having 2 to 12 carbons, or tetrahydrofuran.

13. The temperature-responsive polymer mixture according to claim 8, wherein
the oil-soluble azo polymerization initiator is an azo ester compound.

14. The temperature-responsive polymer mixture according to claim 8, wherein
a number average molecular weight (Mn) is within a range from 500 to 10,000.

15. The temperature-responsive polymer mixture according to claim 8, wherein
a viscosity is within the range from 500 to 10,000 mPa·s when measured as 80% by mass polymer solution at 25° C.

16. The temperature-responsive polymer mixture according to claim 10, wherein
the vinyl ether is one kind of vinyl ether represented by said formula (1), and the difference between the temperature when transmission against light having a wave length of 750 nm reaches 95% and the temperature when said transmission reaches 50% when 1% by mass polymer aqueous solution is heated ($\Delta T$) is less than 7° C.

17. The temperature-responsive polymer mixture according to claim 10, wherein
the vinyl ether is two or more kinds of vinyl ether represented by said formula (1), and the difference between the temperature when transmission against light having a wave length of 750 nm reaches 95% and the temperature when said transmission reaches 50% when 1% by mass polymer aqueous solution is heated (ΔT) is less than 12° C.

* * * * *